Nov. 17, 1936.                W. E. STITZ                2,060,834
                           FREQUENCY METER
                       Filed Aug. 15, 1933         4 Sheets-Sheet 1
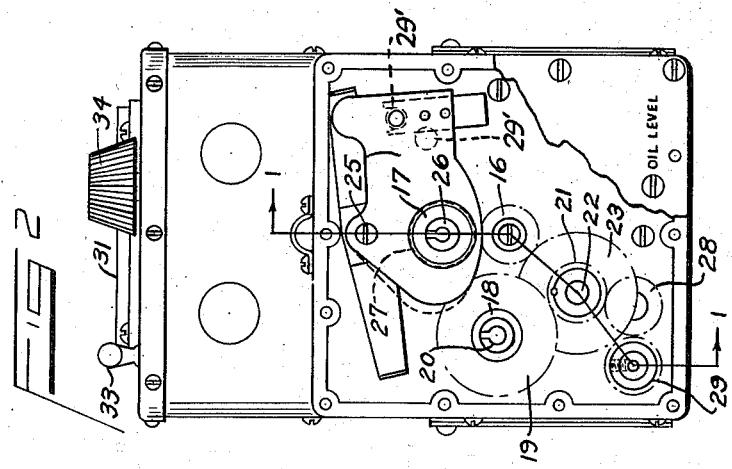
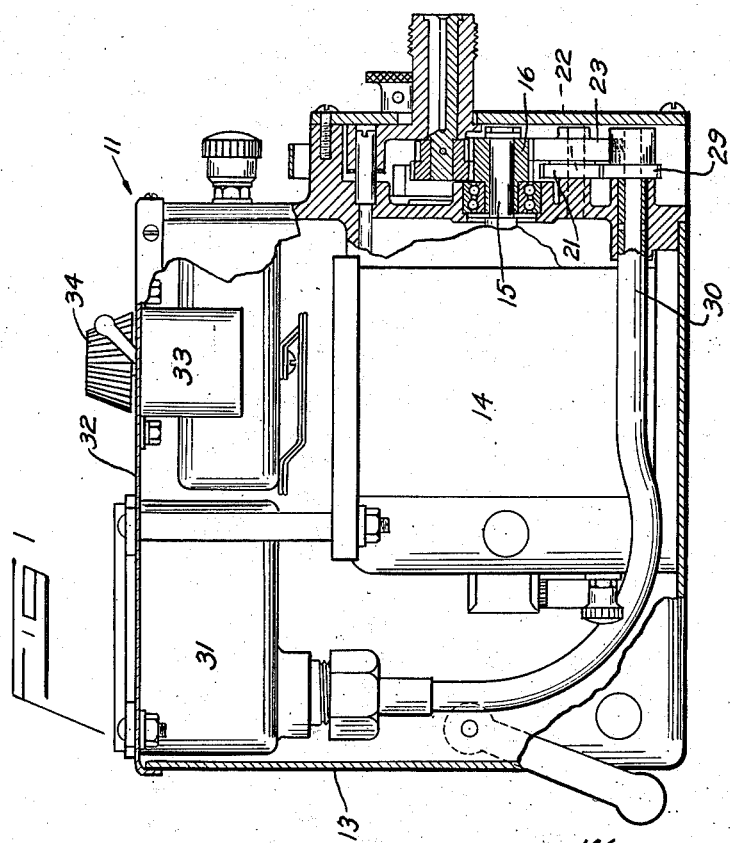
INVENTOR
WILBUR E. STITZ
BY Francis H. Vanderwerker
   and Ubale Koontz
                ATTORNEYS Nov. 17, 1936. W. E. STITZ 2,060,834
FREQUENCY METER
Filed Aug. 15, 1933 4 Sheets-Sheet 2
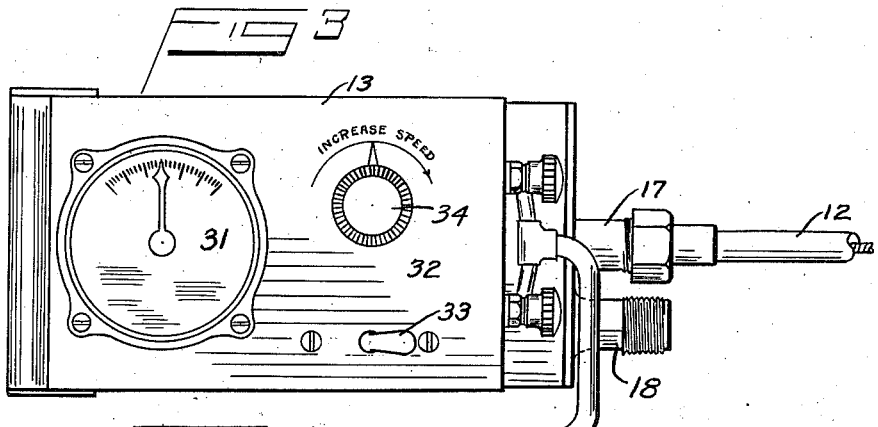
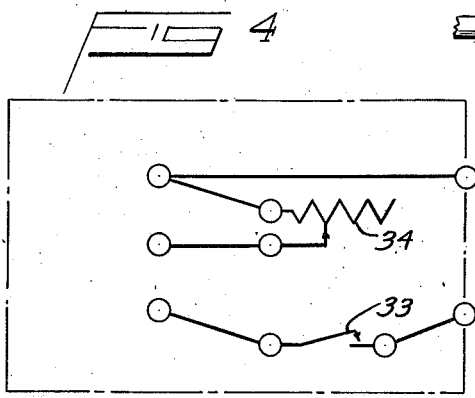
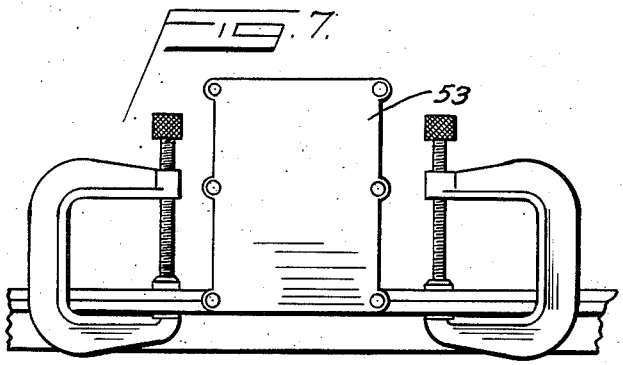
INVENTOR
WILBUR E. STITZ
BY Francis H. Vanderwerker
and Wade Koontz
ATTORNEYS Nov. 17, 1936.  W. E. STITZ  2,060,834
FREQUENCY METER
Filed Aug. 15, 1933  4 Sheets—Sheet 3
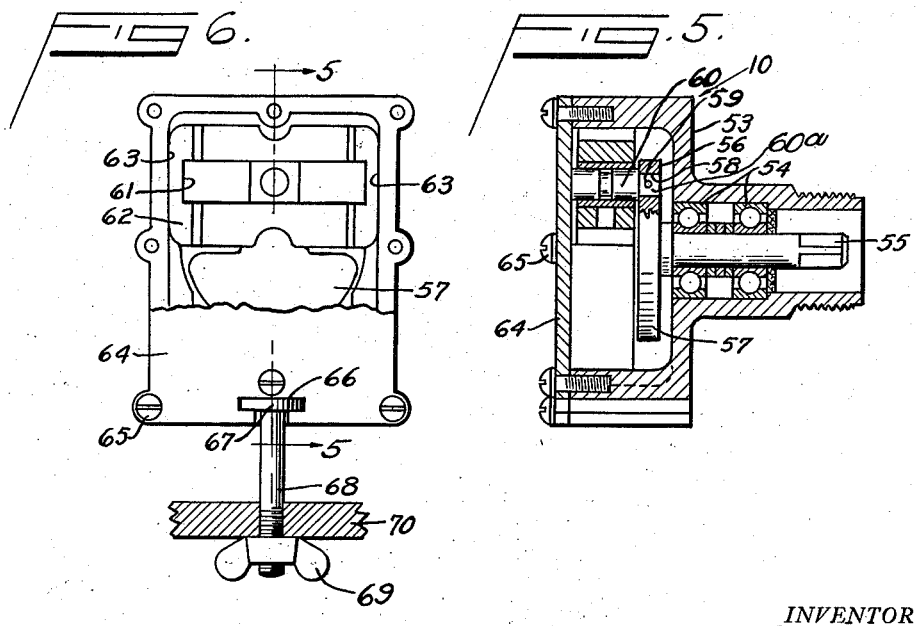
INVENTOR
WILBUR E. STITZ
BY Francis H. Vandenveken
and Wade Koontz
ATTORNEYS

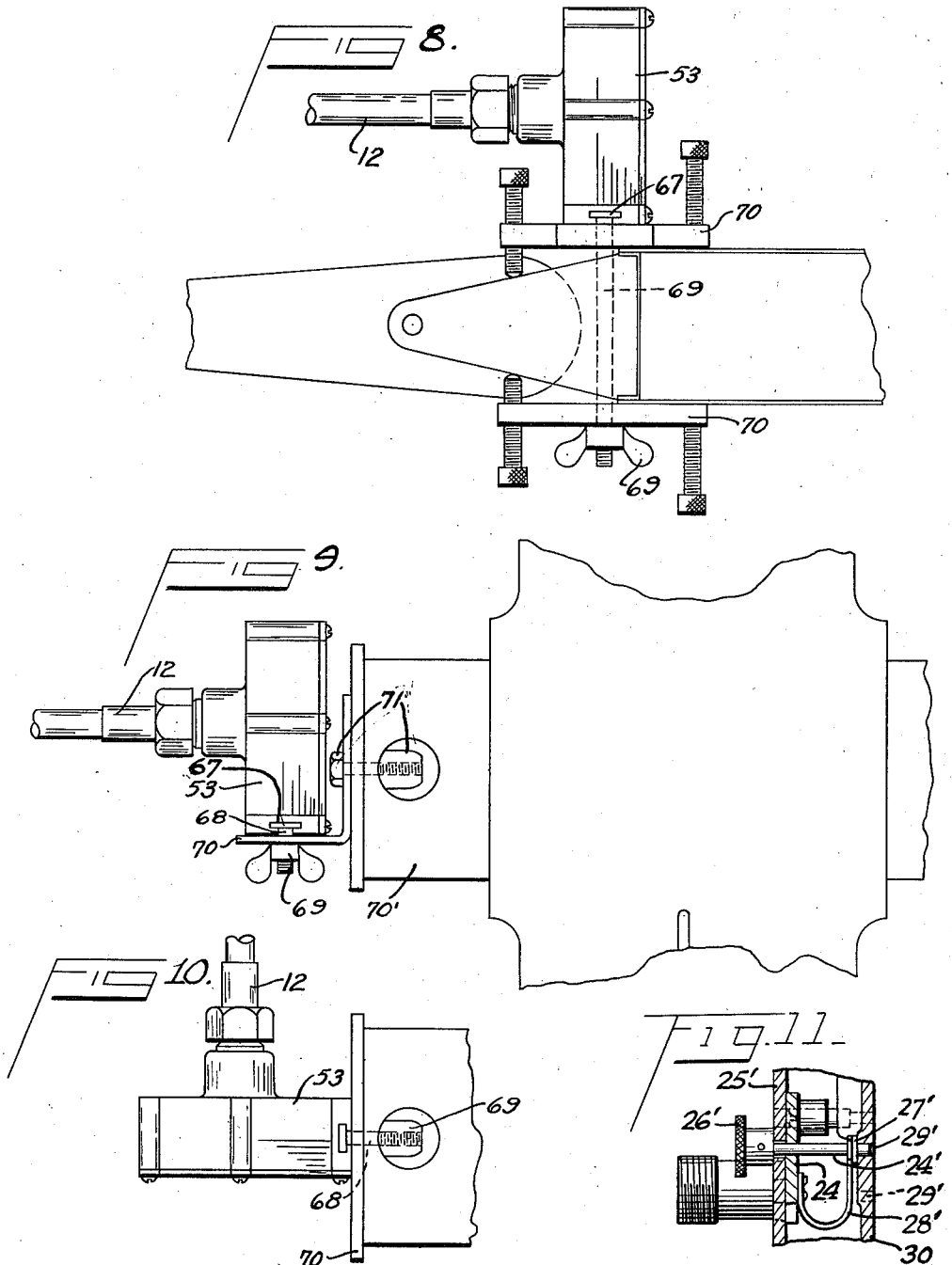

Patented Nov. 17, 1936

2,060,834

UNITED STATES PATENT OFFICE 2,060,834

FREQUENCY METER

Wilbur E. Stitz, Dayton, Ohio

Application August 15, 1933, Serial No. 685,238

1 Claim. (Cl. 73—51)

(Granted under the act of March 3, 1883, as amended April 30, 1928; 370 O. G. 757)

The invention described herein may be manufactured and used by or for the Government for governmental purposes, without the payment to me of any royalty thereon.

The present invention has reference to frequency meters suitable for use in computing the tension of wires, cords, cables and the like, hereinafter termed wires, such for example as those used in rigging an aircraft.

The primary object of the present invention is to provide a frequency meter capable of determining the frequency of vibration of bodies, the materials of which have mass and elasticity.

A further object of the present invention is to provide a portable frequency meter which is of extremely simple and compact construction and capable of being readily attached to tensile bodies, the frequency of vibration of which it is desired to ascertain, such for example as the landing and flying wires of a wing truss of an aircraft; propellers, and the fixed and/or movable aerodynamic surfaces of an aircraft.

A further object of the present invention is to provide a frequency meter of this character which, as compared with other devices of the known kind, will prove to be more simple and far more sensitive in service, that will enable the measuring operation to be carried out quickly and accurately, affording in particular the possibilities of reading directly the required frequency in vibrations per minute, without requiring, when testing different kinds of tensile bodies, the setting of extremely sensitive adjusting devices, an operation not only entailing a great loss of time but which also embodies a great deal of unreliability.

A still further object of the present invention is to construct an instrument whose weight will not affect the ultimate reading and which is so constructed as to be readily adjusted on the specimens or parts to be tested.

A considerable advantage incorporated in the subject matter of the invention resides in the fact that although it admits of broadest application, it yet embodies but a small number of movable parts, and notably but a minimum number of indicating and setting devices, and also that the movable parts are so constructed and arranged that their displacement will affect neither the reliability in service, nor the accuracy of the measurements taken, nor the easy manipulation of the apparatus, so that this latter in its entirety may be directly calibrated for wires under various loaded conditions having different shapes and of different gauge.

The operation of the instrument is based upon an established law of physics, that a wire of given length, of given weight per unit length and subjected to a given tension will vibrate at a definite period, called "natural frequency" (cycles per second) of that particular wire.

The above being among the objects of the present invention, the same consists in certain novel features of construction and combination of parts to be hereinafter described with reference to the accompanying drawings, and then claimed, having the above and other objects in view.

In the accompanying drawings which illustrate suitable embodiments of the present invention, Fig. 1 is a side elevation of the remote control mechanism incorporated in my invention, partially in vertical cross section, the sectional portion being taken on the line 1—1 of Fig. 2.

Fig. 2 is an end view of Fig. 1.

Fig. 3 is a top plan view of the remote control mechanism illustrated in Fig. 2.

Fig. 4 is a schematic wiring diagram of the apparatus used in the remote control mechanism.

Fig. 5 is a vertical sectional view of the vibration generating unit of my invention, taken on the line 5—5 of Fig. 6.

Fig. 6 is an end view of Fig. 5 with the covering of the housing partially broken away.

Figs. 7 to 10 inclusive illustrate the adaptability of the vibration generating unit illustrated in Figs. 5 and 6 to various bodies to be tested.

Fig. 11 is a detail view of the mechanism for operating the change speed gearing.

Referring more particularly to the drawings wherein corresponding parts are designated by like numerals throughout the several views thereof, the frequency meter in the preferred embodiment of my invention herein illustrated comprises generally a vibration generating unit 10, a remote control driving mechanism 11 and a flexible shaft connection 12 interconnecting the same.

The remote control mechanism 11 above mentioned comprises generally a casing 13 within which is mounted a variable speed electric motor 14 adapted for connection to a source of electrical energy.

The driving shaft 15 of the motor 14 has keyed thereon a drive pinion 16 which cooperates with a speed range gear arrangement mounted in the casing 13 of the remote control mechanism 11. As will be noted by referring to Figs. 2 and 3, this speed range gear arrangement comprises generally a primary adapter 17 and a secondary adapter 18 upon either of which the flexible drive connection 12 heretofore mentioned may be mounted depending upon the speed range selected. When the flexible drive connection is attached to the secondary adapter 18, the driving of the vibration generating unit is accomplished through the gear 19 of the shaft 20 mounted in the adapter 18. As will be noted, by referring to Fig. 2, the gear 19 is in meshing engagement with a small pinion 21 mounted upon a shaft 22 which, in turn, carries a large pinion 23 which is at all times in meshing engagement with the drive pinion 16 mounted on the motor shaft. The gear ratio in this particular instance is such that the shaft 20 of the adapter 18 will be rotated approximately at one-fourth the speed of the motor shaft.

Should a different speed range of rotation for the vibration generating unit be desired, this same may be accomplished by attaching the flexible connection 12 to the primary adapter 17. This adapter is mounted, as shown in Fig. 2, upon a shiftable plate 24 which is pivotally mounted upon a stud 25. As shown more particularly in Fig. 11 the plate 24 is provided with a plunger 24', which is slidable in the said plate and extends through the cover plate 25' of the motor housing and has a hand knob 26' mounted upon its outer end. The plunger 24' is provided adjacent its inner end with a shoulder 27', which is yieldably engaged by the forked end of a spring 28', the latter being riveted or otherwise suitably secured at its opposite end to the plate 24. The outer extreme end of the plunger 24' is adapted to engage alternately in a pair of openings 29' formed in the forward wall 30' of the motor housing. As shown in Fig. 2, the openings 29' lie upon equal radii scribed from the axis of the rotation of the stud 25 heretofore mentioned. Consequently when it is desired to shift the plate 24 from the full line to the dotted line position illustrated in Fig. 2, this same may be accomplished by manually moving the outer extremity of the plunger 24' out of engagement with the one opening 29' into registry with the other opening, the effect of which is to move the plate 24 and effect a change in the ratio of the speed gear mechanism. The driving shaft 26 of the primary adapter 17 has mounted thereon a pinion 27 which, when the plate 24 is shifted angularly, into the dotted line position illustrated in Fig. 2, is caused to mesh with the gear 19, heretofore mentioned, and the resulting gear ratio effected is such that the driving shaft 26 of the adapter 17 will be driven approximately at one-half the motor shaft speed. In this manner the speed range of the vibration generating unit may be stepped up or down as desired in order to obtain as wide a speed range of operation as possible in adapting it to various types of tensile bodies whose resonant frequencies of vibration are substantially below the normal speed range of the driving motor.

The driven pinion 16, heretofore mentioned, is connected through gears indicated by the numerals 28 and 29 with the flexible drive shaft 30 of a speed responsive device 31 which is mounted on a panel 32 provided in the top of the casing 13, as illustrated in Figs. 1 and 3. The speed of the driving motor is controlled through the medium of the switch 33 and the rehostat 34 illustrated in Fig. 1, which are connected in the electrical circuit in the manner shown in the diagrammatic view illustrated in Fig. 4.

The vibration generating unit 10, heretofore mentioned, comprises a housing 53 which has rotatably mounted therein, in anti-friction bearings 54, a drive shaft 55 adapted for connection with the remote control mechanism through the medium of the flexible shaft connection 12, heretofore mentioned. The inner end of the shaft 55 is formed with an outwardly projecting flange portion 56 and a diametrically opposite counterbalancing portion 57. The flange portion 56 is provided with an opening 58 adjacent its outer extremity within which is received the inner reduced end 60a of a stud 60. For convenience, this stud may be locked in place by the pin 59 which passes through suitable laterally disposed openings provided on the inner reduced end 60a of the stud 60 and the flange portion of the shaft. The outer end of the stud 60 is slidable in a transverse slotted opening 61 formed in an oscillating member 62 adapted to oscillate in a vertical plane when the shaft 55 is rotated. Suitable guideways 63 formed by the inner surfaces of the side walls of the housing guide the oscillating member when it is being oscillated by rotation of the shaft 55. For convenience in assembling, the housing 53 is provided with a removable plate 64 which is secured thereto by machine screws 65. The bottom of the housing 53 is provided with a T-shaped slot 66 within which is received the correspondingly shaped head 67 of a locking bolt 68 which, in the present instance, accommodates a hand nut 69 and clamping block 70 in order to permit the housing to be rigidly clamped on the body to be tested.

Figs. 7 to 10 inclusive illustrate various methods of clamping the housing 53 to various shaped bodies or surfaces to be tested and the description of the method of clamping in connection with Figs. 5 and 6 is thought to amply cover in a general sense the method of clamping illustrated in these figures. As shown more particularly in Figs. 9 and 10, the vibration generating unit illustrated in Figs. 5 and 6 is shown attached to the hub of a conventional propeller blade. In Fig. 9 the clamping block 70 is shown as rigidly secured to the clamping nut generally indicated by the numeral 70' of the propeller hub through the medium of the screw and nut 71'. The clamping block 70, as shown in this figure, is provided with a centrally disposed locking bolt 68 having a T-shaped head 67, which engages in the T-shaped slot provided in the housing of this unit. A hand nut 69 is provided for securing the locking bolt and housing of the generating unit to the clamping block 70.

*Method of operation*

To operate the instrument as a frequency meter which is utilized for determining the tension, such, for example as the landing or flying wires for rigging an airplane or for testing the tension in truss wires, it is essential that all cowling and wire ties should be removed so that the wire to be tested is free to vibrate from its point of attachment to the fuselage to its point of attachment to the wing of the aircraft, such for example, as the main spar thereof. The vibration generating unit is then clamped preferably to the center of the wire and the motor or driving end of the instrument is placed on a substantial support and the flexible shaft positioned to hang freely. The speed of the motor is then adjusted by the rheostat on the panel of the remote control mechanism until the wire being tested vibrates through a large amplitude. If the speed of the motor is properly adjusted, the wire and vibration generating unit will vibrate or oscillate back and forth through a distance of approximately one inch.

When the wire vibrates in a maximum amplitude, the reading of the speed responsive device heretofore mentioned, which in this particular instance is a conventional tachometer, is an indication of the vibrations per minute of the wire and if the tension in the wire is increased, the tachometer will show a higher reading at the point of maximum amplitude of vibration of the wire.

In operating the instrument as a frequency meter, the correct tachometer reading is obtained when the wire and vibration generating unit attached to the wire is moving or oscillating through the largest possible distance. When the vibration generating unit of the instrument, which is clamped to the wire, is oscillating in a maximum amplitude, it will have a tendency to stabilize the speed of the motor and the tachometer hand will remain at some fixed point. If the rheostat is adjusted to increase the speed of the motor, the vibrating wire will act as a brake and tend to keep the motor from speeding up and it is necessary to increase the rheostat setting considerably to cause the motor to speed up. This behavior of the instrument and with some experience with its operation makes it possible to obtain correct readings without watching for the wire to vibrate.

Since it is desirable under certain circumstances to place the vibration generating unit in the center of the wire to obtain a correct reading, some doubt may arise in determining the center when the wire is attached to a strap or fitting, which is free to vibrate with the wire. The correct length of the wire to use should be from a fuselage fitting to a wing fitting. Any strut, link, or wire extension should be included in the length of the wire. It is to be understood that it is not absolutely essential to the proper operation of the instrument that the vibration generating unit be positioned at the exact center of the wire being tested in that correct readings may be obtained by placing the vibration generating unit at other points along the length of the wire being tested.

There are several methods of calculating the tension in wires or rods from the tachometer reading of the instrument; the correct method to use depends upon the position of the vibration generating means, the nodes in which the wire is made to vibrate, and the dimension of the wire.

When the vibration generating unit is placed at the center of the wire, and the wire is made to vibrate in one node or loop, the tachometer reading at the point of maximum amplitude of vibration is not the natural frequency of the wire, but the reading is a function of the tension in the wire and the tension can be calculated. A method of calculating the tension of a wire loaded at its center is given in the following formula.

The formula for a string or wire weighted at its center is:

$$F = \frac{1}{2L}\sqrt{\frac{P}{M}} \times C\frac{2}{\pi}$$

Where F = the frequency in cycles per second (tachometer reading divided by 60)
L = Length of wire in feet
P = Tension in pounds
M = Mass density of the wire
C = A constant The constant C is a function of the ratio of vibrator and wire weights. The method of finding this constant is determined by experiment or mathematically. However, it is not necessary to use this method for each wire. The constant can be worked out for a range of wire sizes and plotted in curve form.

When the wire sizes increase, the constant C increases and the frequencies are not lowered as much as in the case of a small wire. The above method gives good results for wires, the dimensions of which are such that the effect of bending rigidity can be neglected. If the vibrator is placed in the center of a wire, and a tachometer reading is obtained when the wire is vibrating in two nodes or loops, the vibrator will not move with respect to the wire, and therefore will not affect the frequency reading except that the frequency reading will be twice that of the natural frequency, and the tension can be calculated by the following formula:

$$F = \frac{1}{L}\sqrt{\frac{P}{M}}$$

Since vibrating a wire in two nodes or loops has the effect of reducing the length by one-half, some correction for bending rigidity must be made in calculating the tension from the tachometer reading.

The formula which corrects for bending rigidity is given in the following formula:

$$F = \frac{1}{2L}\sqrt{\frac{P+P_c}{M}} \times C$$

Where F = Frequency in cycles per second
L = Length in feet
P = Tension load in pounds
M = Mass per unit length of wire $$P_c = \frac{\pi^2 EA}{\left(\frac{L}{P}\right)^2} = \text{Euler's column load}$$

The formula can be used to calculate the tension from the instrument reading. When the tension is to be calculated from the instrument reading the formula becomes:

$$F = \frac{c}{2L}\frac{P+P_c}{M}$$

Where C is a constant which accounts for the vibrator weight.

Since the effect of bending rigidity on the frequency of vibration is a function of Euler's column load, it can be readily seen that for streamline wires bending rigidity can be neglected without any loss in accuracy of the tension calculation.

The frequency meter hereinabove described has a number of applications other than measuring the frequency of vibration of wires. The instrument may be very successfully used as a frequency meter in determining the period of vibration of airplane propellers as well as in determining the frequency of vibration of wings and wing tips. Both the bending and torsional period of vibration may be determined by placing the vibrator on the wing tip and reading the tachometer when the tip is vibrating through a maximum amplitude. The weight of the vibrator is so small compared to the wing that the frequency reading should be accurate within the accuracy limit of the tachometer. The instrument may also be used to find and locate members whose natural periods of vibration fall within the range of the period of vibration of the power plant. It is entirely possible that the instrument may be used wherever vibration problems arise in connection with airplane structures.

While but one specific embodiment of the invention has been herein shown and described, it will be understood that numerous details of the construction shown may be altered or omitted without departing from the spirit of this invention as defined by the following claim.

What I claim is:

A vibration generating unit for vibrating a body comprising, a housing adapted to be rigidly clamped to the body to be tested, a counterbalanced driven member rotatably mounted in said housing, a vibration producing device operatively connected to said driven member and movable in a plane normal to the axis of rotation of said driven member, said device comprising a member having a transversely extending slotted opening and mounted for oscillation in said housing and an eccentrically disposed stud carried by said driven member engaging in said slotted opening, clamping means carried by said housing for rigidly clamping said unit on the body to be tested in predetermined position so that the plane of movement of the center of mass of said oscillated member is coincident with the plane of vibration of said vibrating body.

WILBUR E. STITZ.